: US007887243B2

(12) United States Patent
Abel et al.

(10) Patent No.: US 7,887,243 B2
(45) Date of Patent: Feb. 15, 2011

(54) MINIATURE MECHANICAL TRANSFER OPTICAL COUPLER

(75) Inventors: Philip Abel, Overland Park, KS (US); Carl Watterson, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 204 days.

(21) Appl. No.: 12/048,944

(22) Filed: Mar. 14, 2008

(65) Prior Publication Data

US 2009/0226137 A1  Sep. 10, 2009

Related U.S. Application Data

(60) Provisional application No. 60/895,326, filed on Mar. 16, 2007.

(51) Int. Cl.
 *G02B 6/38* (2006.01)
 *G02B 6/26* (2006.01)
 *G02B 6/42* (2006.01)

(52) U.S. Cl. .............................. 385/73; 385/44; 385/47; 385/52; 385/70; 385/71; 385/72

(58) Field of Classification Search .................. 385/24, 385/33, 44, 45, 47, 52, 70–74
 See application file for complete search history.

(56) References Cited

U.S. PATENT DOCUMENTS

| | | | |
|---|---|---|---|
| 3,715,596 A | 2/1973 | DeMent | |
| 3,920,983 A | 11/1975 | Schlafer et al. | |
| 4,130,345 A | * 12/1978 | Doellner | 385/44 |
| 4,176,908 A | * 12/1979 | Wagner | 385/47 |
| 4,679,934 A | 7/1987 | Ganguly et al. | |
| 4,708,423 A | * 11/1987 | Erman et al. | 385/14 |
| 4,775,972 A | 10/1988 | Ih et al. | |
| 5,369,511 A | 11/1994 | Amos | |
| 5,394,490 A | 2/1995 | Kato et al. | |
| 5,428,635 A | 6/1995 | Zhiglinsky et al. | |
| 5,666,448 A | 9/1997 | Schoenwald et al. | |
| 5,757,994 A | 5/1998 | Schoenwald et al. | |
| 6,147,953 A | 11/2000 | Duncan | |

(Continued)

FOREIGN PATENT DOCUMENTS

EP  01299711  1/2002

(Continued)

*Primary Examiner*—Daniel Petkovsek
(74) *Attorney, Agent, or Firm*—Hovey Williams LLP

(57) ABSTRACT

A miniature mechanical transfer (MT) optical coupler ("MMTOC") for optically connecting a first plurality of optical fibers with at least one other plurality of optical fibers. The MMTOC may comprise a beam splitting element, a plurality of collimating lenses, and a plurality of alignment elements. The MMTOC may optically couple a first plurality of fibers disposed in a plurality of ferrules of a first MT connector with a second plurality of fibers disposed in a plurality of ferrules of a second MT connector and a third plurality of fibers disposed in a plurality of ferrules of a third MT connector. The beam splitting element may allow a portion of each beam of light from the first plurality of fibers to pass through to the second plurality of fibers and simultaneously reflect another portion of each beam of light from the first plurality of fibers to the third plurality of fibers.

10 Claims, 6 Drawing Sheets

U.S. PATENT DOCUMENTS

| | | | |
|---|---|---|---|
| 6,334,716 B1 * | 1/2002 | Ojima et al. | 385/89 |
| 6,422,761 B1 * | 7/2002 | Naghski et al. | 385/73 |
| 6,456,769 B1 | 9/2002 | Furusawa et al. | |
| 6,464,852 B1 | 10/2002 | Gorfinkel et al. | |
| 6,477,403 B1 | 11/2002 | Eguchi et al. | |
| 6,503,711 B1 | 1/2003 | Krull et al. | |
| 6,600,861 B2 | 7/2003 | Furusawa et al. | |
| 6,692,160 B2 * | 2/2004 | Qin et al. | 385/74 |
| 6,751,395 B1 | 6/2004 | Novotny et al. | |
| 6,798,941 B2 | 9/2004 | Smith et al. | |
| 6,898,346 B2 | 5/2005 | Mercy et al. | |
| 7,027,198 B2 | 4/2006 | Yao | |
| 7,031,567 B2 | 4/2006 | Grinderslev et al. | |
| 7,040,814 B2 | 5/2006 | Morimoto et al. | |
| 7,098,871 B1 | 8/2006 | Tegreene et al. | |
| 7,129,163 B2 | 10/2006 | Sherrer et al. | |
| 7,234,874 B2 * | 6/2007 | Morse et al. | 385/53 |
| 7,324,728 B2 * | 1/2008 | Dames et al. | 385/47 |
| 7,338,217 B2 * | 3/2008 | Morimoto et al. | 385/88 |
| 2002/0071627 A1 | 6/2002 | Smith et al. | |
| 2002/0168158 A1 | 11/2002 | Furusawa et al. | |
| 2003/0002809 A1 | 1/2003 | Jian | |
| 2003/0128917 A1 | 7/2003 | Turpin et al. | |
| 2003/0152326 A1 | 8/2003 | Morimoto et al. | |
| 2003/0157538 A1 | 8/2003 | Krull et al. | |
| 2003/0210859 A1 | 11/2003 | Mercey et al. | |
| 2004/0076390 A1 | 4/2004 | Dong Yang et al. | |
| 2004/0109636 A1 | 6/2004 | Korn | |
| 2004/0141684 A1 | 7/2004 | Wildnauer et al. | |
| 2004/0175073 A1 | 9/2004 | Grinderslev et al. | |
| 2005/0110157 A1 | 5/2005 | Sherrer et al. | |
| 2005/0111797 A1 | 5/2005 | Sherrer et al. | |
| 2005/0200941 A1 | 9/2005 | Yao | |
| 2005/0201751 A1 | 9/2005 | Yao | |
| 2006/0008199 A1 | 1/2006 | Glebov et al. | |
| 2006/0023987 A1 | 2/2006 | Yao | |
| 2006/0051103 A1 | 3/2006 | Ranganath | |
| 2006/0140544 A1 | 6/2006 | Morimoto et al. | |
| 2006/0284790 A1 | 12/2006 | Tegreene et al. | |
| 2007/0002924 A1 | 1/2007 | Hutchinson et al. | |
| 2007/0024860 A1 | 2/2007 | Tobiason et al. | |
| 2007/0031086 A1 | 2/2007 | Wildnauer et al. | |
| 2007/0040268 A1 | 2/2007 | Sherrer et al. | |

FOREIGN PATENT DOCUMENTS

| | | |
|---|---|---|
| EP | 01515364 | 3/2005 |
| EP | 01517166 | 3/2005 |
| WO | WO 9102992 A1 | 3/1991 |
| WO | WO 9858079 A1 | 12/1998 |
| WO | WO 0076102 A1 | 12/2000 |
| WO | WO 0204929 A3 | 1/2002 |
| WO | WO 0225358 A2 | 3/2002 |
| WO | WO 03009032 A1 | 1/2003 |
| WO | WO 03042733 A1 | 5/2003 |
| WO | WO 2005099408 A2 | 10/2005 |
| WO | WO 2007005700 A1 | 1/2007 |
| WO | WO 2007014125 A2 | 2/2007 |

* cited by examiner

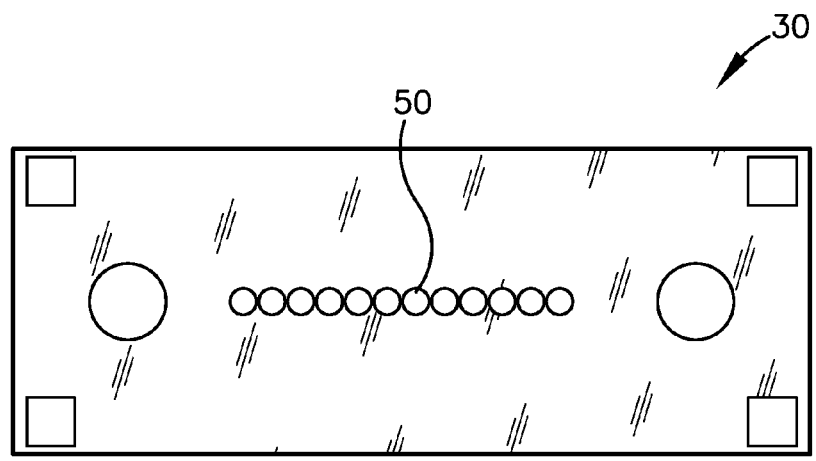
Fig. 6
*(prior art)*
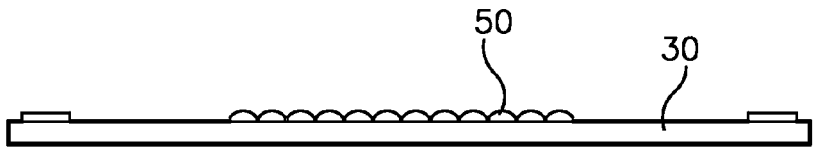
Fig. 7
*(prior art)*
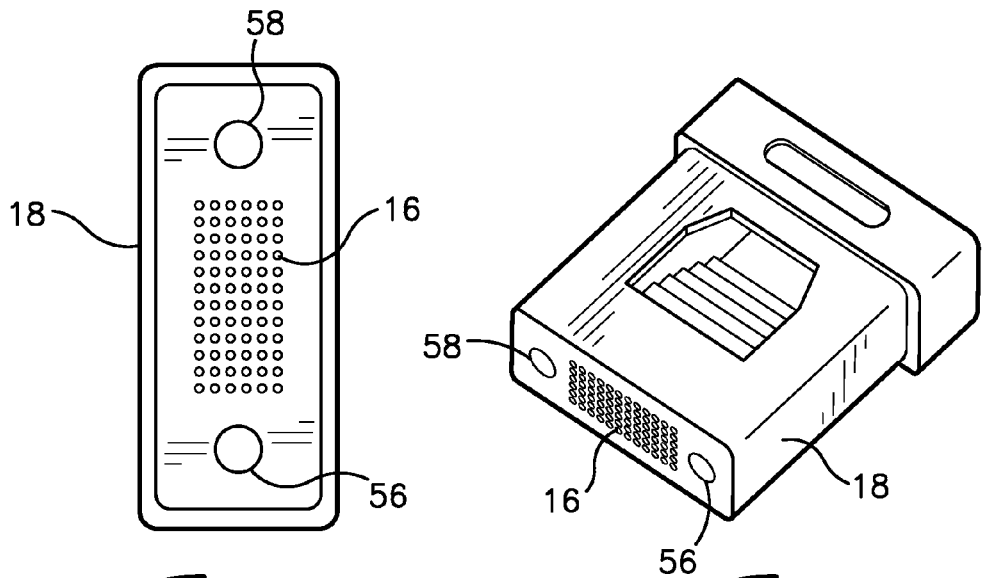
Fig. 8
*(prior art)*
Fig. 9
*(prior art)*

MINIATURE MECHANICAL TRANSFER OPTICAL COUPLER

RELATED APPLICATIONS

This nonprovisional patent application claims priority benefit, with regard to all common subject matter, of earlier-filed U.S. provisional patent application titled "Miniature MT Optical Coupler (MMTOC)", Ser. No. 60/895,326, filed Mar. 16, 2007. The identified earlier-filed application is hereby incorporated by reference in its entirety into the present application.

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

BACKGROUND

1. Field

Embodiments of the present invention relate to an optical coupler for optical fibers. More particularly, the invention relates to a miniature mechanical transferring (MT) optical coupler ("MMTOC") which can passively and communicatively connect at least two ribbons of optical fibers.

2. Related Art

Fiber optic technology generally refers to the transmission of light through transparent glass or plastic fibers. The light beams transmitted through the fibers, known as optical fibers, may be encoded with data by modulating the light beams.

Optical fibers are often bundled together in an optical fiber ribbon. In order to connect one optical fiber ribbon (or one set of optical fibers) to another optical fiber ribbon, a variety of fiber optic connectors may be used. Fiber optic connectors typically mechanically couple and align the cores of fiber so that light can pass from one fiber to another. One type of fiber optic connector is a mechanical transfer (MT) connector. The MT connector may be male or female, having a plurality of small openings or ferrules through which individual fibers may be threaded. The male MT connector is designed to physically connect with the female MT connector to communicatively connect the fibers of the optical fiber ribbons.

Currently, if an application requires one optical fiber ribbon to send light beams to two different optical fiber ribbons, the cores of the fibers must be actively aligned. Two commercially available methods exist for splitting the signals from one optical fiber ribbon into two optical fiber ribbons. One method for splitting signals from one optical fiber ribbon into two optical fiber ribbons requires the formation of a star coupler, which is formed by laying fibers next to each other and fusing them together. Manufacturing a star coupler is time intensive and requires a great deal of precision to get the light beam to split evenly. Another method for splitting the signals from one optical fiber ribbon into two optical fiber ribbons requires the formation of optical wave guides, which involves laying down the optical fibers onto a piece of silicon and then overcoating the silicon dioxide to form optical "tunnels". These tunnels can be shaped to split the optical signal into multiple paths. This method is expensive and complex. Each of these prior art methods require that the fibers be actively coupled, meaning that at least a portion of each individual fiber must be physically adapted in a substantially permanent way, such as fusing two fibers together or bonding the fibers together with another substance. This type of active coupling is time consuming and can not easily be altered or disconnected without cutting the fiber.

Accordingly there is a need for a method and apparatus for communicatively coupling two or more sets of optical fibers that does not suffer from the problems and limitations of the prior art.

SUMMARY

Various embodiments of the invention provide a miniature mechanical transfer (MT) optical coupler ("MMTOC") for communicatively connecting a first set of optical fibers with at least one other set of optical fibers without the fibers touching one another, being cut, spliced, fused, chemically bonded, or otherwise physically altered. The MMTOC may comprise a beam splitting element, a first collimating lens, a second collimating lens, a third collimating lens, a fourth collimating lens, and at least one alignment element. The beam splitting element may comprise a first, second, third, and fourth side as well as a reflective portion for partially transmitting and partially reflecting light beams. The first collimating lens may be fixed at the first side of the beam splitting element, the second collimating lens may be fixed at the second side of the beam splitting element, the third collimating lens may be fixed at the third side of the beam splitting element, and the fourth collimating lens may be fixed at the fourth side of the beam splitting element.

The first and second collimating lenses may be fixed at opposing first and second sides of the beam splitting element and may share a center axis, while the third and fourth collimating lenses may be fixed at opposing third and fourth sides of the beam splitting element and share a center axis perpendicular to the center axis of the first and second collimating lenses. Additionally, the collimating lenses may be collimating lens arrays manufactured to collimate a plurality of parallel beams. Also, the beam splitting element may be an optical prism that allows a portion of light to be transmitted and a portion to be reflected at an angle. Additionally, the beam splitting element may be customized with an optical bandpass filter coating or other optical coatings known in the art.

The MMTOC may be mechanically attachable to at least a first, second, third, and fourth MT connector by the at least one alignment element. A plurality of optical fibers may be disposed in a plurality of ferrules of the MT connectors. The alignment elements may align each of the MT connectors with one of the collimating lenses such that, for example, a plurality of light beams extending from the first MT connector may be collimated and then split by the beam splitting element, with a portion of each of the plurality of light beams being reflected into the third collimating lens and the third MT connector and another portion of each of the light beams being transmitted through the beam splitting element into the second collimating lens and the second MT connector.

Additionally, a plurality of light beams extending from the fourth MT connector may be collimated and then split by the beam splitting element, with a portion of each of the plurality of light beams being reflected into the second collimating lens and the second MT connector and another portion of each of the light beams being transmitted through the beam splitting element into the third collimating lens and the third MT connector.

These and other important aspects of the present invention are described more fully in the detailed description below.

BRIEF DESCRIPTION OF THE DRAWINGS

Embodiments of the present invention are described in detail below with reference to the attached drawing figures, wherein:

FIG. 6 is a plan view of one of the collimating lenses of FIG. 1;

FIG. 7 is a side view of one of the collimating lenses of FIG. 1;

FIG. 8 is a plan view of one of the MT connectors of FIG. 2;

FIG. 9 is a perspective view of one of the MT connectors of FIG. 2;

Figure 1:
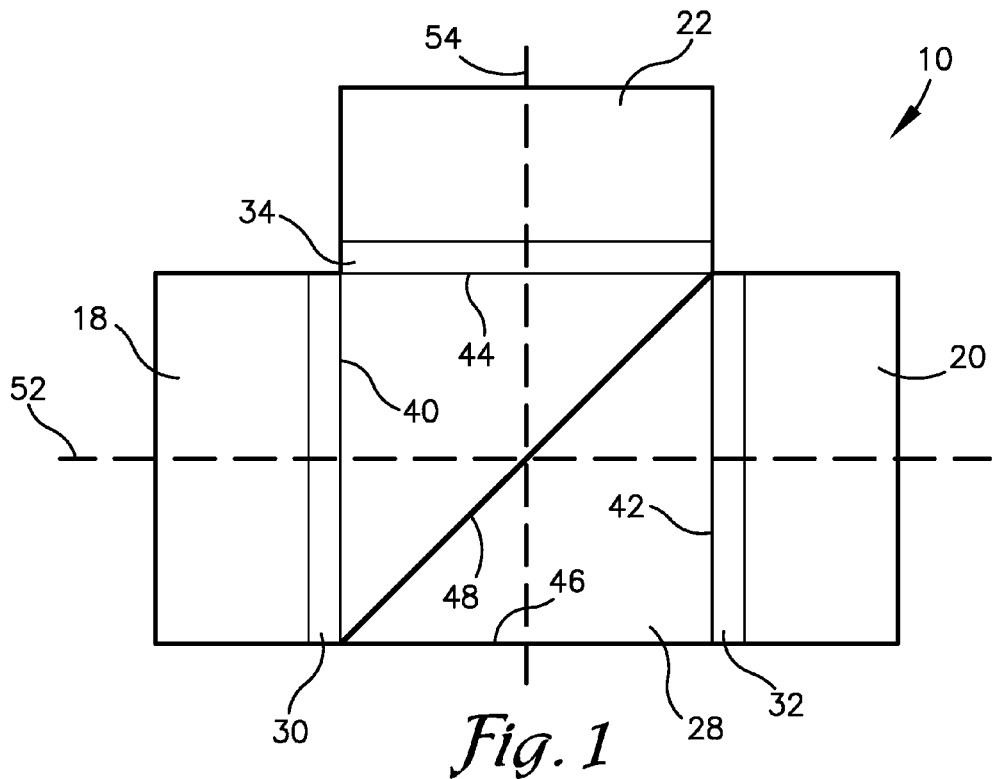
FIG. 1 is a side schematic view of a miniature mechanical transferring (MT) optical coupler (MMTOC) having a beam splitting element and three collimating lenses according to an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Figure 2:
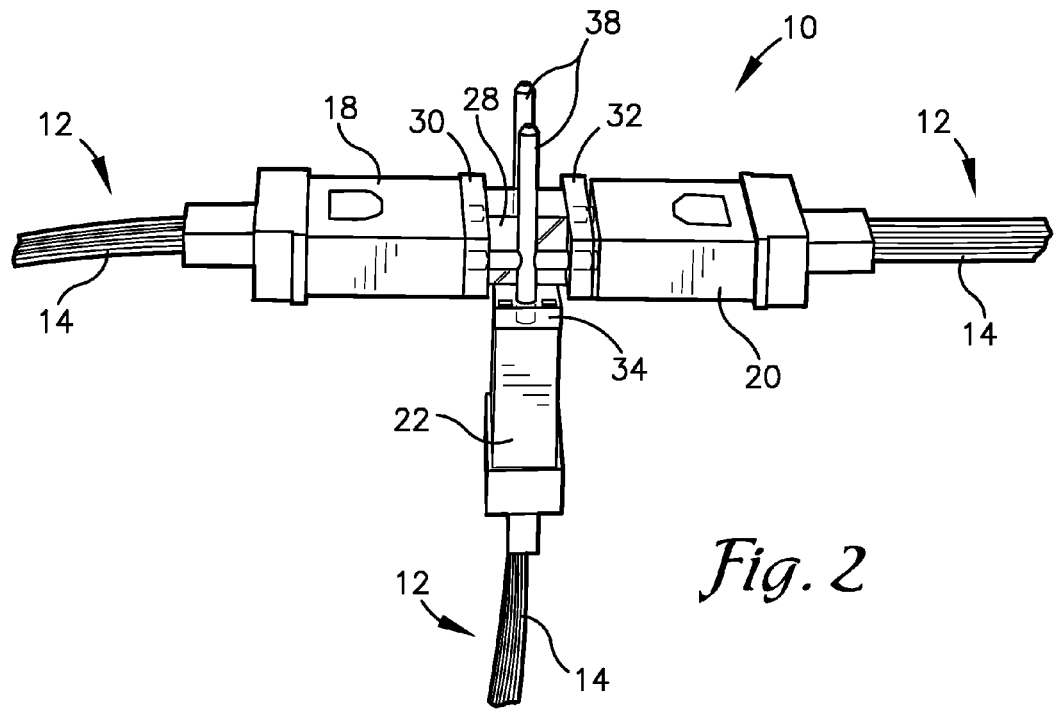
FIG. 2 is a perspective view of three MT connectors attaching three optical fiber ribbons to the MMTOC of FIG. 1 with a plurality of alignment elements.
Figure 3:
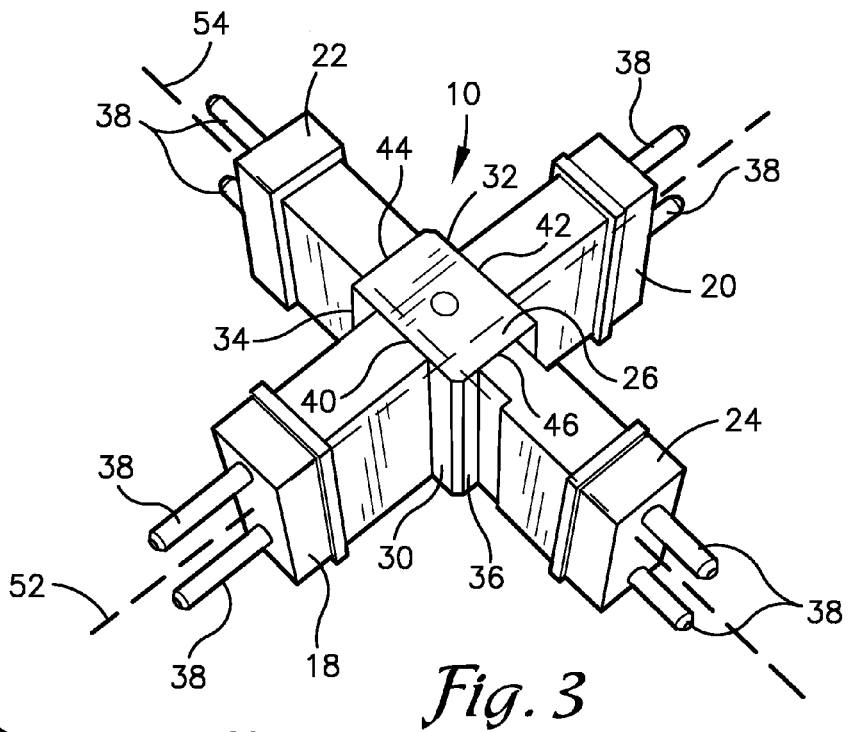
FIG. 3 is a perspective view of four MT connectors attached to the MMTOC of FIG. 1 having a fourth collimating lens.
Figure 5:
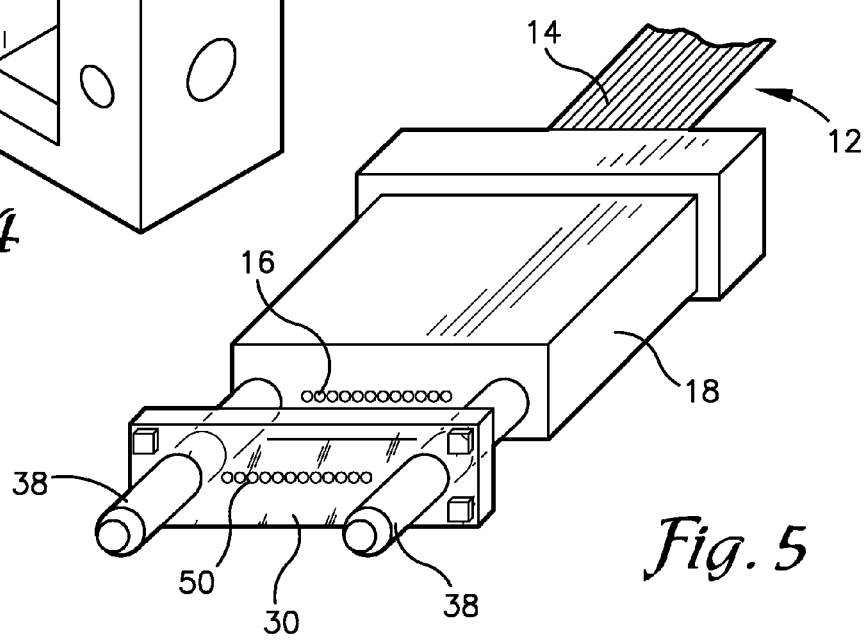
FIG. 5 is a perspective view of one of the MT connectors of FIG. 2 connected to one of the collimating lenses by two alignment elements.

Embodiments of the present invention, as illustrated in FIGS. 1-3, provide a miniature mechanical transferring (MT) optical coupler ("MMTOC") 10 for optically coupling a plurality of optical fiber ribbons 12 each comprising a plurality of optical fibers 14 whose ends are disposed in ferrules 16 (illustrated in FIG. 5) of one of a plurality of MT connectors 18,20,22,24. The MMTOC 10 may comprise a mount 26, a beam splitting element 28; a plurality of collimating lenses 30,32,34,36; and at least one alignment element 38 for connecting the MT connectors 18-24 to the MMTOC 10.

Figure 4:
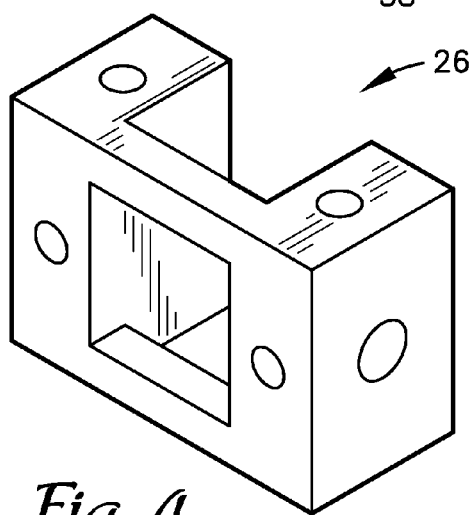
FIG. 4 is a perspective view of a mount for holding the beam splitting element and collimating lenses of FIG. 1 in proper alignment with one another.

The mount 26, illustrated in FIGS. 3 and 4, may be composed of metal, plastic, or any substantially solid material. The mount 26 may be attached to each of the beam splitting element 28, the collimating lenses 30-36, and the alignment element 38, maintaining these elements in a fixed relationship with one another. In various embodiments of the invention, the mount 26 may fix the collimating lenses 30-36 at right angles relative to each other in a substantially rectangular configuration, with the beam splitting element 28 fixed inward of the mount 26 and the collimating lenses 30-36.

The beam splitting element 28 may have a plurality of sides 40,42,44,46 and a reflective portion 48 for partially transmitting and partially reflecting light beams, as illustrated in FIG. 1. The beam splitting element 28 may be an optical prism with partially reflective properties or a partially reflective coating. However, the beam splitting element 28 may be any apparatus for splitting an individual beam of light into multiple light beams, as known in the art. The partially reflective coating may be any thin film optical coating known in the art. Changing the coating or reflective properties of the beam splitting element 28 may allow a greater portion of the beam to pass through the beam splitting element 28 and a smaller portion to be reflected, or vice versa. In this way, the beam splitting element 28 may be customized for a variety of applications. The coatings may also be used to manipulate incoming light beams in other ways. For example, a bandpass filter coating may be used to customize the beam splitting element 28, providing a bandpass filter to the incoming signal. Additionally or alternatively, various optical coatings may be applied to the collimating lenses 30-36 for particular applications.

Each of the collimating lenses 30-36 may be manufactured to collimate multiple parallel light beams, as known in the art. For example, as illustrated in FIGS. 6-7, each of the collimating lenses 30-36 may comprise a fiber collimating lens array 50 such as the Multi-mode Micro Lens Arrays manufactured by OMRON ELECTRONIC COMPONENTS LLC. Alternatively, the collimating lenses 30-36 may be any lens or apparatus known in the art for collimating a plurality of light beams simultaneously.

The collimating lenses 30-36 may be configured to collimate light beams from the plurality of fibers 14 disposed in the plurality of ferrules 16 of the MT connectors 18-24. For example, one of the collimating lenses 30-36 may collimate twelve light beams from twelve optical fibers 14 disposed in twelve ferrules 16 in a 1×12 channel MT connector 18 illustrated in FIG. 5. However, the collimating lenses 30-36 may be customized for a fewer or a greater number of parallel light beams without substantially increasing the physical size of the collimating lens 30-36, due to the compact nature of MT connectors and collimating lens arrays. For example, collimating lenses 30-36 may be customized to collimate 72 channels for use with a 6×12 channel MT connector 18. A 6×12 channel MT connector 18 as manufactured by US CONEC is illustrated in FIGS. 8-9. Furthermore, in various other embodiments of the invention, lenses 30-36 for collimating 100 or more parallel beams of light may be used.

The collimating lenses 30-36 may comprise a first collimating lens 30 fixed at a first side 40 of the beam splitting element 28, a second collimating lens 32 fixed at a second side 42 of the beam splitting element 28, a third collimating lens 34 fixed at a third side 44 of the beam splitting element 28, and a fourth collimating lens 36 fixed at a fourth side 46 of the beam splitting element 28. In various embodiments of the invention, the first and second collimating lenses 30,32 may be disposed on opposing sides of the beam splitting element 28 and aligned with each other such that they share a center axis 52. Additionally, the third and fourth collimating lenses 34,36 may be disposed on opposing sides of the beam splitting element 28 and aligned with each other such that they share a center axis 54, which may be perpendicular to the center axis 52, as illustrated in FIG. 3. Furthermore, the reflective portion 48 of the beam splitting element 28 may be fixed at a 45 degree angle relative to each of the center axes 52,54 of the collimating lenses 30-36.

Figure 10:
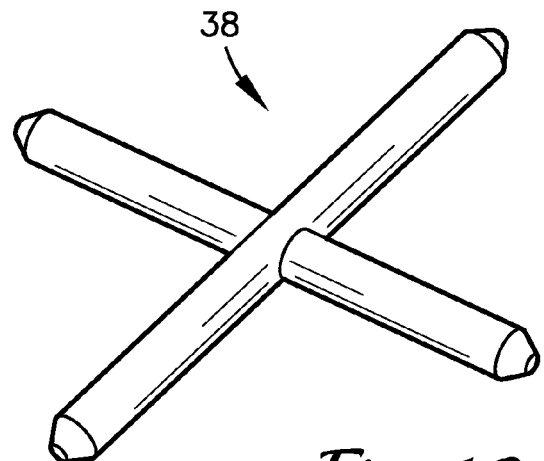
FIG. 10 is a perspective view of one of the alignment elements of FIG. 2.

The alignment elements 38 may be any alignment device for aligning at least one of the MT connectors 18-24 with at least one of the collimating lenses 30-36. For example, the alignment elements 38 may be cross-pins, as illustrated in FIGS. 2 and 10, having four appendages. One appendage of each of a pair of the cross-pins may slide into one of two openings 56,58 (illustrated in FIGS. 8-9) of a first MT connector 18, aligning the first MT connector 18 with the first collimating lens 30. Additionally, another appendage of each of the pair of cross-pins may slide into one of two openings (not shown) of a second MT connector 20, aligning the second MT connector 20 with the second collimating lens 32. The alignment elements 38 may also align a third and a fourth MT connector 22,24 with the third and fourth collimating lenses 34,36 respectively.

In use, the beam splitting element 28 may split a plurality of parallel light beams 60 in a plurality of directions to be received by multiple optical fiber ribbons 12. For example, the beam splitting element 28 may allow a portion of a beam of light to pass laterally through the reflective portion 48, while another portion of the beam of light may impinge the reflective portion 48 at a 45 degree angle and be reflected at a 90 degree angle from its original path of travel, as illustrated in FIG. 11.

Specifically, the plurality of fibers 14 disposed in the plurality of ferrules 16 of the first MT connector 18 may be optically coupled to the plurality of fibers 14 disposed in the plurality of ferrules 16 of the second MT connector 20 via the MMTOC 10, such that at least a portion of each light beam extending from the plurality of fibers 14 of the first MT connector 18 may be received by the plurality of fibers 14 of the second MT connector 20. Additionally, the plurality of fibers 14 disposed in the plurality of ferrules 16 of the third MT connector 22 may be optically coupled to the first MT connector 18 via the MMTOC 10. In this embodiment of the invention, the beam splitting element 28 may transmit a portion of each beam of light extending from the plurality of fibers 14 of the first MT connector 18 to the plurality of fibers 14 of the second MT connector 20 and reflect another portion of each beam of light extending from the plurality of fibers 14 of the first MT connector 18 to the plurality of fibers 14 of the third MT connector 22.

Figure 11:
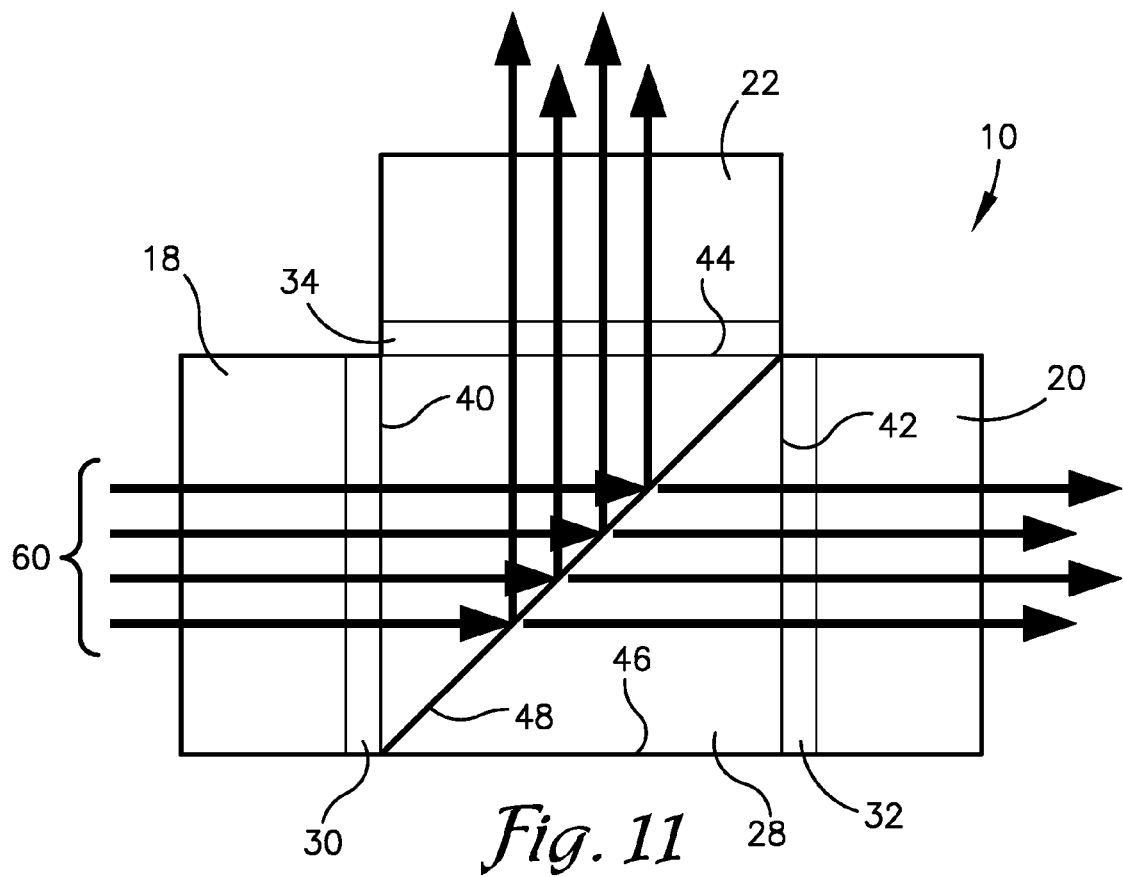
FIG. 11 is a side schematic view of the MMTOC of FIG. 1 illustrating a plurality of parallel light beams being split by the beam splitting element.

For example, as illustrated in FIG. 11, if the first MT connector 18 is aligned with the first collimating lens 30, the second MT connector 20 is aligned with the second collimating lens 32, and the third MT connector 22 is aligned with the third collimating lens 34, then the optical fibers 14 of the first MT connector 18 are optically coupled with the optical fibers 14 of the second and third MT connectors 20,22. In this configuration, a first portion of each of the plurality of light beams 60 from the plurality of fibers 14 of the first MT connector 18 is received by the plurality of fibers 14 of the second MT connector 20 and a second portion of each of the plurality of light beams 60 from the plurality of fibers 14 of the first MT connector 18 is received by the plurality of fibers 14 of the third MT connector 22.

Additionally, when the fourth MT connector 24 is aligned with the fourth collimating lens 36 as in FIG. 3, a portion of each of the plurality of light beams 60 extending from the fourth MT connector 24 may be transmitted through the beam splitting element 28 into optical fibers 14 of the third MT connector 22 while another portion of each of the plurality of light beams 60 extending from the fourth MT connector 24 may be reflected at a 90 degree angle by the beam splitting element 28 into the second MT connector 20.

In various embodiments of the invention, a laser (not shown) may be actively aligned to the MMTOC 10 proximate at least one collimating lens for diagnostic purposes. For example, a laser beam may be sent through the third lens 34 and be partially transmitted through the beam splitting element 28 and partially reflected at a 90 degree angle through the first lens 30 to a monitor (not shown) on the first MT connector 18, thereby notifying the user or system that the first MT connector 18 is properly aligned with the beam splitting element 28.

Figure 12:
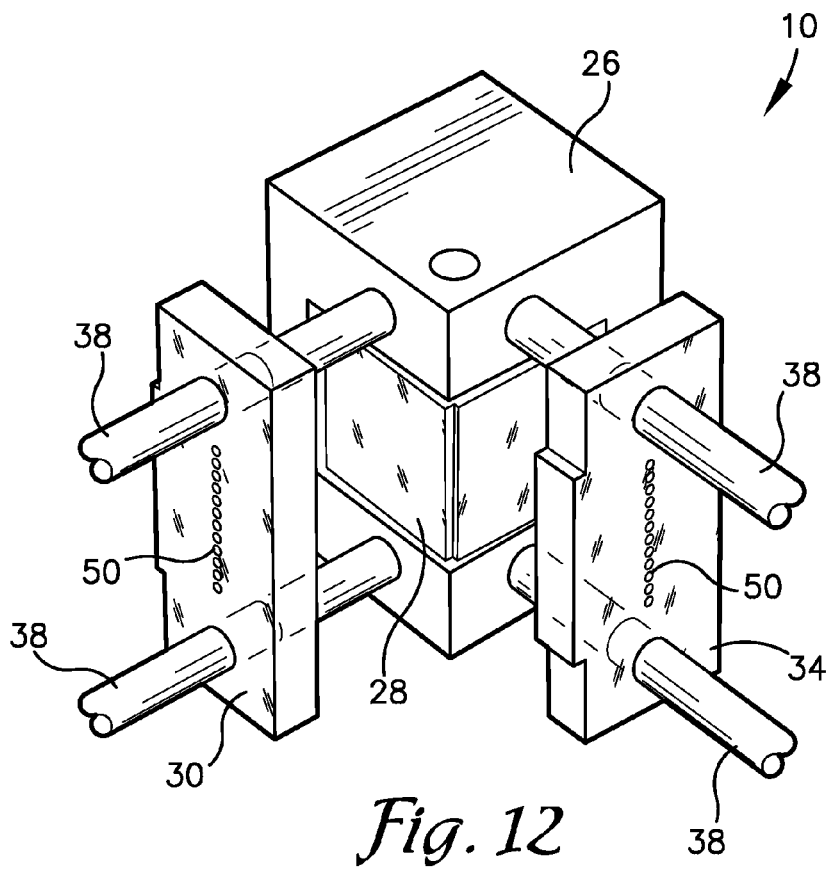
FIG. 12 is a perspective view of an MMTOC having only two collimating lenses, a mount, two alignment elements, and a beam splitting element according to another embodiment of the invention.
Figure 13:
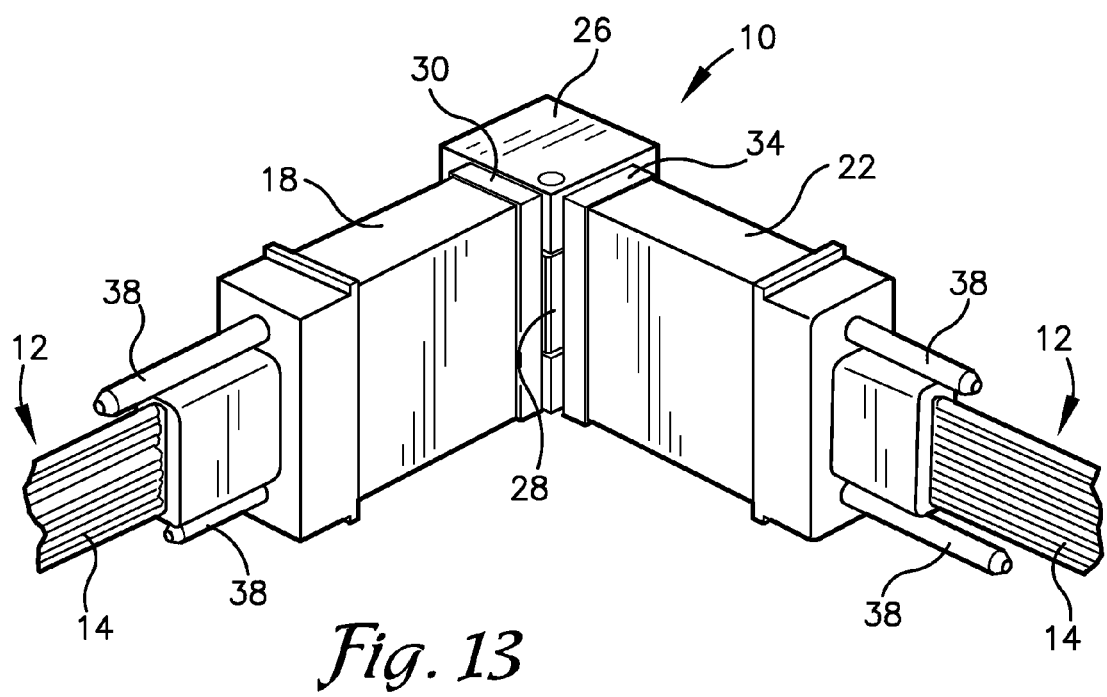
FIG. 13 is a perspective view of two MT connectors attaching two optical fiber ribbons to the MMTOC of FIG. 12.
Figure 14:
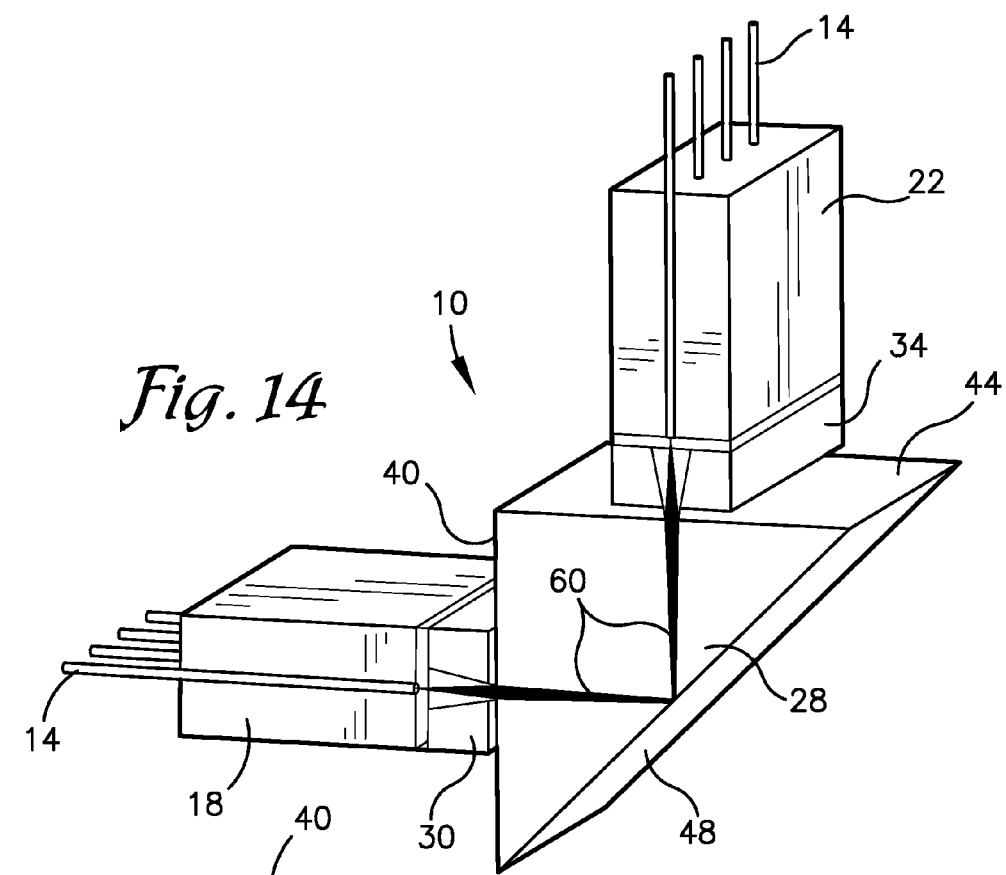
FIG. 14 is cross-sectional perspective view of the MMTOC of FIG. 13.

Although the invention has been described with reference to the embodiments illustrated in the attached drawings, it is noted that equivalents may be employed and substitutions made herein without departing from the scope of the invention as recited in the claims. For example, in alternative embodiments of the invention illustrated in FIGS. 12-14, the first and third collimating lenses 30,34 may be positioned such that their center axes 52,54 are perpendicular to each other and the second lens 32 may be omitted. In this arrangement, the light beams 60 transmitted by the optical fibers 14 of the first MT connector 18 may be reflected at a 90 degree angle by the beam splitting element 28 into the third MT connector 22, or vice versa. This configuration is particularly useful for situations in which the physical path of the optical fibers 14 turns by 90 degrees, since bending optical fibers at right angles may damage the fibers.

Figure 15:
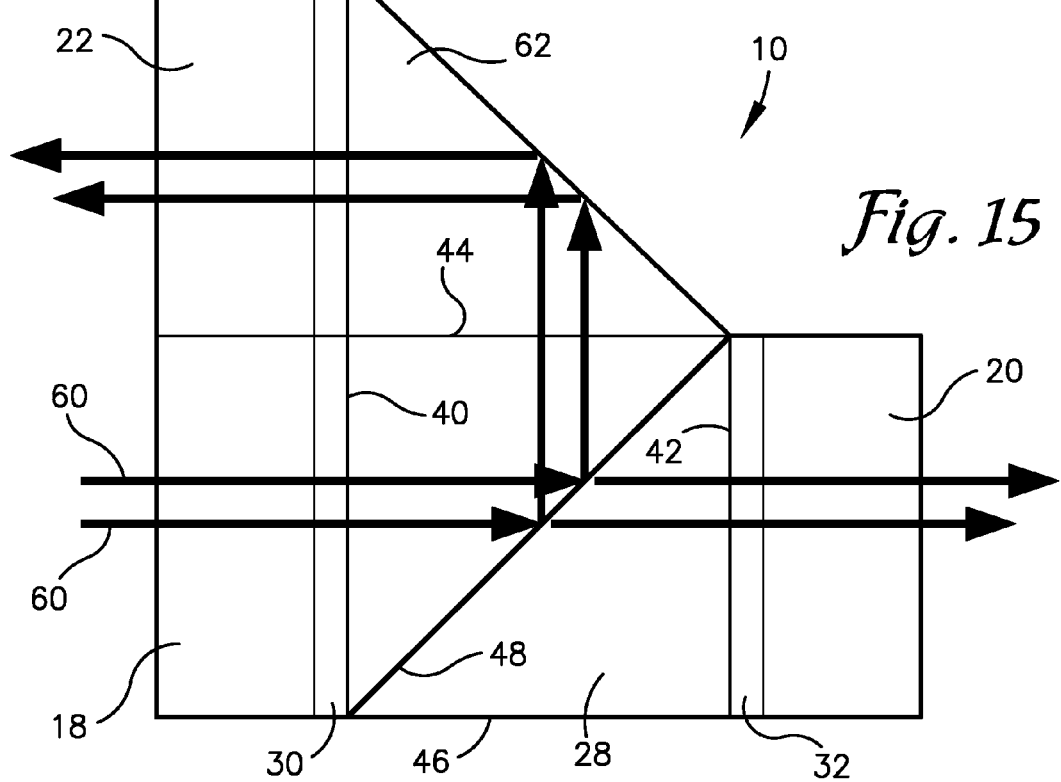
FIG. 15 is a side schematic view of an MMTOC having a right angle prism for routing the parallel light beams in a different direction.

In other alternative embodiments of the invention, as illustrated in FIG. 15, a right angle prism 62 may be attached at the third side 44 of the beam splitting element 28 for routing purposes. In this configuration, the third collimating lens 34 may be positioned such that its center axis 54 is parallel with the center axis 52 of the first and second lenses 30,32. So, for example, in this configuration, light beams 60 transmitted from the first MT connector 18 may be both reflected at a 90 degree angle by the beam splitting element 28 and transmitted laterally through the beam splitting element 28 to the second MT connector 20. The reflected portion of the beams 60 may impinge the right angle prism 62 and reflect at another 90 degree angle toward the third MT connector 22.

Having thus described an embodiment of the invention, what is claimed as new and desired to be protected by Letters Patent includes the following:

1. An optical coupler for transmitting a plurality of light beams from a plurality of ends of optical fibers disposed in ferrules of a first mechanical transferring (MT) connector to a plurality of ends of optical fibers disposed in ferrules of a second MT connector, the optical coupler comprising:

a beam splitting element having a first side, a second side, and a partially reflective portion for partially transmitting and partially reflecting the light beams;

a first collimating lens fixed at the first side of the beam splitting element;

a second collimating lens fixed at the second side of the beam splitting element; and at least one alignment element configured for passively aligning the first MT connector with the first collimating lens and passively aligning the second MT connector with the second collimating lens such that at least a portion of each of the plurality of light beams extending from the first MT connector are directed by the beam splitting element through the second collimating lens into optical fibers of the second MT connector, wherein the at least one alignment element comprises cross-pins having a plurality of appendages each configured to slide into openings formed in the MT connectors, aligning the first MT connector with the first collimating lens, the second MT connector with the second collimating lens.

2. The optical coupler of claim 1, wherein the first and second sides of the beam splitting element are opposite one another, with the first and second collimating lenses having a common center axis.

3. The optical coupler of claim 2, wherein the plurality of collimating lenses further comprises a third collimating lens fixed at a third side of the beam splitting element, and wherein a center axis of the third collimating lens is perpendicular to the center axis of the first and second collimating lenses.

4. The optical coupler of claim 3, wherein a third MT connector is aligned with the third collimating lens such that a first portion of each of the plurality of light beams extending from a plurality of optical fibers of the first MT connector is received by a plurality of optical fibers of the second MT connector and a second portion of each of the plurality of light beams from the plurality of optical fibers of the first MT connector is received by a plurality of optical fibers of the third MT connector.

5. The optical coupler of claim 3, further comprising a fourth collimating lens fixed at a fourth side of the beam splitting element, having the same center axis as the third collimating lens.

6. The optical coupler of claim 2, further comprising a right angle prism fixed at a third side of the beam splitting element to redirect light beams to or from the beam splitting element.

7. The optical coupler of claim 1, wherein the first and second sides of the beam splitting element are perpendicular to each other, with a center axis of the first collimating lens being perpendicular to a center axis of the second collimating lens.

8. The optical coupler of claim 1, wherein a partially reflective portion of the beam splitting element is situated at a 45 degree angle relative to a center axis of each of the collimating lenses, thereby reflecting a portion of a light beam passing through any of the collimating lenses at a 90 degree angle.

9. The optical coupler of claim 1, wherein the collimating lenses comprise collimating lens arrays for collimating a plurality of parallel light beams.

10. The optical coupler of claim 1, wherein at least one of the beam splitting element and the collimating lenses is customized with an optical bandpass filter coating.

* * * * *